United States Patent
Rettig (10) Patent No.: US 9,381,793 B2
(45) Date of Patent: Jul. 5, 2016

(54) FLAT BED TARPING SYSTEM

(71) Applicant: Alan Rettig, Munford, TN (US)

(72) Inventor: Alan Rettig, Munford, TN (US)

(*) Notice: Subject to any disclaimer, the term of this patent is extended or adjusted under 35 U.S.C. 154(b) by 0 days.

(21) Appl. No.: 14/499,392

(22) Filed: Sep. 29, 2014

(65) Prior Publication Data

US 2016/0089964 A1     Mar. 31, 2016

(51) Int. Cl.
*B60J 11/00* (2006.01)
*B60J 7/08* (2006.01)
*B60P 7/08* (2006.01)

(52) U.S. Cl.
CPC ............. *B60J 7/085* (2013.01); *B60P 7/0876* (2013.01)

(58) Field of Classification Search
CPC ............ B60J 7/085; B60J 7/102; B60J 7/062; B60P 7/0876; A01F 25/13; B62D 33/0207
USPC ................. 296/98, 100.01, 100.11, 100.12, 296/100.13, 100.14, 100.15, 100.16, 296/100.18, 105; 114/361; 135/115, 119
See application file for complete search history.

(56) References Cited

U.S. PATENT DOCUMENTS

| | | | | |
|---|---|---|---|---|
| 4,402,544 A * | 9/1983 | Artim | ...................... | B60J 7/104 135/132 |
| 5,542,733 A * | 8/1996 | Kintz | ........................ | B60J 7/10 160/26 |
| 5,579,794 A * | 12/1996 | Sporta | ..................... | E02D 5/801 135/115 |
| 5,722,712 A * | 3/1998 | Pollen | .................... | B60J 7/1278 135/132 |
| 6,065,796 A * | 5/2000 | Verduyn | ............... | B60P 7/0815 296/100.01 |
| 6,109,680 A * | 8/2000 | Horner | ..................... | B60J 7/085 296/100.11 |
| 6,499,790 B1 | 12/2002 | Johnston | | |
| 6,502,709 B1 | 1/2003 | Parker | | |
| 6,511,117 B1 | 1/2003 | Henning | | |
| 6,712,419 B1 * | 3/2004 | Gothier | ..................... | B60J 7/085 296/100.15 |
| 7,425,030 B2 | 9/2008 | Warner | | |
| 7,703,833 B2 | 4/2010 | Petelka | | |
| 8,047,600 B2 | 11/2011 | Leblanc et al. | | |
| 8,075,240 B2 | 12/2011 | Stevenson et al. | | |
| 8,303,017 B2 | 11/2012 | Leblanc et al. | | |
| 8,439,424 B1 | 5/2013 | Damsi et al. | | |
| 8,454,076 B2 | 6/2013 | Bourcier et al. | | |
| 8,491,032 B1 * | 7/2013 | Verduyn | .................. | B60J 5/065 296/100.01 |
| 8,496,283 B1 * | 7/2013 | Schmeichel | ............. | B60J 7/085 296/100.16 |
| 2002/0021018 A1 * | 2/2002 | Royer | ...................... | B60J 7/085 296/98 |
| 2003/0052505 A1 * | 3/2003 | Searfoss | .................. | B60J 7/085 296/98 |
| 2003/0052506 A1 * | 3/2003 | Royer | ...................... | B60J 7/085 296/98 |
| 2003/0140568 A1 * | 7/2003 | Glynos | ................... | A01F 25/13 52/4 |
| 2003/0193208 A1 * | 10/2003 | Ciferri | ..................... | B60J 7/085 296/98 |
| 2004/0261325 A1 * | 12/2004 | Glynos | .................. | A01F 25/13 52/4 |

(Continued)

*Primary Examiner* — Kiran B Patel
(74) *Attorney, Agent, or Firm* — David J. Kreher (57) ABSTRACT

A tarpaulin or portable tarping system for covering loads on flatbed trailers. Said portable tarping system includes retractable tarps of various lengths, for instance, 5 ft., 10 ft., or 20 ft. lengths that are affixed to the cut-outs of the flatbed and then stretched across the load. These tarps can be placed adjacent to each other along the length of the flatbed, or placed on opposing sides of the flatbed, or placed across the width of the flatbed to ensure maximum overlap of the tarps and full coverage of the load.

9 Claims, 8 Drawing Sheets

(56) References Cited

U.S. PATENT DOCUMENTS

| | | | | |
|---|---|---|---|---|
| 2005/0125959 A1* | 6/2005 | Hanson | B60P 7/083 | 24/68 CD |
| 2006/0043754 A1* | 3/2006 | Smith | B60J 7/085 | 296/98 |
| 2007/0132268 A1* | 6/2007 | Bromberek | B60J 7/085 | 296/98 |
| 2009/0167049 A1* | 7/2009 | Lariviere | B60J 11/02 | 296/98 |
| 2010/0219656 A1* | 9/2010 | Chenowth | B60J 7/068 | 296/98 |
| 2011/0175390 A1* | 7/2011 | Verduyn | B60P 7/0807 | 296/100.12 |
| 2012/0001010 A1* | 1/2012 | Payne | B62D 1/00 | 242/390.2 |
| 2012/0187232 A1* | 7/2012 | Molen | B60P 7/0876 | 242/557 |
| 2012/0235440 A1* | 9/2012 | Searfoss | B60J 7/085 | 296/100.18 |
| 2013/0062025 A1* | 3/2013 | Bromberek | B65D 43/02 | 160/242 |
| 2013/0175822 A1* | 7/2013 | Eggers | B60J 7/085 | 296/98 |
| 2013/0199568 A1* | 8/2013 | Black, Jr. | B60S 3/00 | 134/18 |
| 2013/0199738 A1* | 8/2013 | Lieze, Jr. | B65D 43/26 | 160/127 |
| 2013/0249236 A1* | 9/2013 | Smith | B65D 90/66 | 296/98 |
| 2013/0313855 A1* | 11/2013 | Schmeichel | B60J 7/085 | 296/98 |
| 2013/0328345 A1* | 12/2013 | Barley | B60J 7/085 | 296/98 |
| 2014/0021736 A1* | 1/2014 | Chenowth | H02H 7/0855 | 296/100.11 |
| 2014/0021737 A1* | 1/2014 | Chenowth | B60J 7/068 | 296/100.12 |
| 2014/0034771 A1* | 2/2014 | Hecker | B65H 49/325 | 242/395 |
| 2014/0117296 A1* | 5/2014 | Shrader | B66F 9/18 | 254/278 |
| 2014/0145466 A1* | 5/2014 | Reeder | B60J 7/085 | 296/100.14 |
| 2014/0265425 A1* | 9/2014 | Bremer | B60J 7/085 | 296/98 |
| 2014/0339850 A1* | 11/2014 | Grimes | B60J 7/085 | 296/100.18 |

* cited by examiner

FLAT BED TARPING SYSTEM

AMENDED CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

AMENDED DESCRIPTION

1. Amended Field of the Invention

A tarpaulin or portable tarping system for covering loads on flatbed trailers. Said portable tarping system includes retractable tarps of various widths, for instance, 5 ft., 10 ft., or 20 ft. that are affixed to the cut-outs of the flatbed, stretched across the load, and then the leading edge is attached to the flatbed. These portable tarping systems are portable in that an individual operator can install, operate and remove them without the difficulties associated with the present state of the art. The retracting means may comprise a manual crank, a motorized system, a redundant system with a manual crank and a motorized system, or a spring and ratchet system. Portable tarping systems can be placed adjacent to each other along the length of the flatbed, placed on opposing sides of the flatbed, or placed across the width of the flatbed to ensure maximum overlap of the tarps and full coverage of the load.

2. Background of the Invention

One of the problems with the current tarping systems for flatbed trailers is that they are cumbersome for an individual to operate. These systems generally extend the length of the flatbed trailer and if manually operated must be cranked or pulled over the load it is to cover. Automatic systems are also possible but fail to reduce the work required by the operator. Some methods have been developed such that a series of ribs or support structure affixed to the flatbed over which the tarp is pulled to make the covering process easier, however, this still requires the installation and removal of the ribs or support structure for each load.

In U.S. Pat. No. 8,454,076, Bourcier et al., discloses cover for a flatbed which comprises a support structure over which a tarp is placed, whereas the present disclosure allows for multiple tarps to be used to cover a load and does not require a support structure.

In U.S. Pat. No. 8,439,424, Damsi et al., discloses a modular bow system for creating a frame over a flatbed, over which a tarp is placed, whereas the present disclosure allows for multiple tarps to be used to cover a load and does not require a modular bow system.

In U.S. Pat. No. 6,511,117, Henning, discloses tarp tensioning system to be used with a tarp pulled over a bow system, whereas the present disclosure involves a tarp system with a retraction mechanism that does not requires tensioning or a bow system.

In U.S. Pat. No. 6,499,790, Johnston, discloses a system and method for covering and uncovering a trailer comprising supports adapted to be operatively connected to the ends of a trailer to position a roller with a cover attached thereto so that the cover can cover the load, whereas the present disclosure allows for multiple tarps to be used to cover a load and does not require a support structure.

In U.S. Pat. No. 8,047,600, Leblanc et al., discloses a retractable tarp cover and a plurality of U shaped bows over which the tarp is placed, whereas the present disclosure allows for multiple tarps to be used to cover a load and does not require a support structure.

In U.S. Pat. No. 8,303,017, Leblanc et al., discloses a sidewall panel and tarp system for flatbed trailers, whereas the present disclosure allows for multiple tarps to be used to cover a load and does not require sidewalls to be constructed on the trailer.

In U.S. Pat. No. 6,502,709, Parker, discloses a drive-through work station that automatically covers a flatbed trailer with a tarp, whereas the present disclosure allows for multiple tarps to be used to cover a load and does not require a support structure, can be easily operated by an individual and is significantly less expensive.

In U.S. Pat. No. 7,703,833, Petelka, discloses a combination of end members and support members that create a structure over which a tarp can be placed, whereas the present disclosure allows for multiple tarps to be used to cover a load and does not require a support structure.

In U.S. Pat. No. 8,075,240, Stevenson et al., discloses a frame and tarp combination that is assembled on the ground and then placed over the load on a flatbed with the use of a forklift, whereas the present disclosure allows for multiple tarps to be used to cover a load on the flatbed and does not require a support structure or the use of a forklift to place the structure on the flatbed.

In U.S. Pat. No. 7,425,030, Warner, discloses a method of covering variable size loads on a flatbed involving posts affixed to the corners of the flatbed connected at the apex of the posts by a series of cables to create a rectangular cable structure along which the tarp is pulled from the front of the trailer to its rear by a pulley system, whereas the present disclosure allows for multiple tarps to be used to cover a load and does not require a support structure or pulley system.

AMENDED SUMMARY OF THE INVENTION

A portable tarping system that can be made in various widths such that the portable tarping system can be affixed to a flatbed trailer and an individual can then extend the tarp from the portable tarping system over a load on the trailer and affix the leading edge of said tarp to another location on the flatbed, thus covering all or a portion of a load. Once the leading edge of the tarp is detached from the trailer, the retracting means of the portable tarping system retracts the tarp, allowing the portable tarping system to be easily removed from the flatbed. The width of said portable tarping system is variable at the discretion of the user.

The retracting means, of the portable tarping system may be one of multiple systems including a manual crank, a motorized system, a redundant system with a manual crank and a motorized system, or a spring and ratchet system.

In one preferred embodiment of the tarp, the normal tarp, the width tarp being extended from the portable tarping system is approximately the width of the portable tarping system.

In a second preferred embodiment of the tarp, the left extended tarp, the width of the tarp is longer than the portable tarping system where the tarp is attached to the portable tarping system so that, when extended, the left side of the tarp can be folded out from the tarp to extend beyond the length of the portable tarping system to guarantee overlap between adjacent portable tarping systems, and prior to retracting the tarp, the left side that extends beyond the length of the portable tarping system can be folded back over the main portion of the tarp to allow the whole tarp to then be retracted into the portable tarping system.

In a third preferred embodiment of the tarp, the right extended tarp, the width of the tarp is longer than the portable tarping system where the tarp is attached to the portable tarping system so that, when extended, the right side of the tarp can be folded out from the tarp to extend beyond the length of the portable tarping system to guarantee overlap between adjacent portable tarping systems, and prior to retracting the tarp, the right side that extends beyond the length of the portable tarping system can be folded back over the main portion of the tarp to allow the whole tarp to then be retracted into the portable tarping system.

In a fourth preferred embodiment of the tarp, the dual extended tarp, the width of the tarp is longer than the portable tarping system where the tarp is attached to the portable tarping system so that, when extended, the left and right sides of the tarp can be folded out from the tarp to extend beyond the length of the portable tarping system to guarantee overlap between adjacent portable tarping systems, and prior to retracting the tarp, the left and right sides that extend beyond the length of the portable tarping system can be folded back over the main portion of the tarp to thus allow the whole tarp to then be retracted into the portable tarping system.

AMENDED BRIEF DESCRIPTION OF THE SEVERAL VIEWS OF THE DRAWING

FIG. 8A [Cancelled]
FIG. 8B [Cancelled]
FIG. 8C [Cancelled]
FIG. 8D [Cancelled]
FIG. 9 [Cancelled]
FIG. 10 [Cancelled]
FIG. 11 [Cancelled]
FIG. 12 [Cancelled]
FIG. 13 [New] is a view of a generic tarp.

AMENDED DETAILED DESCRIPTION OF THE INVENTION

Figure 1:
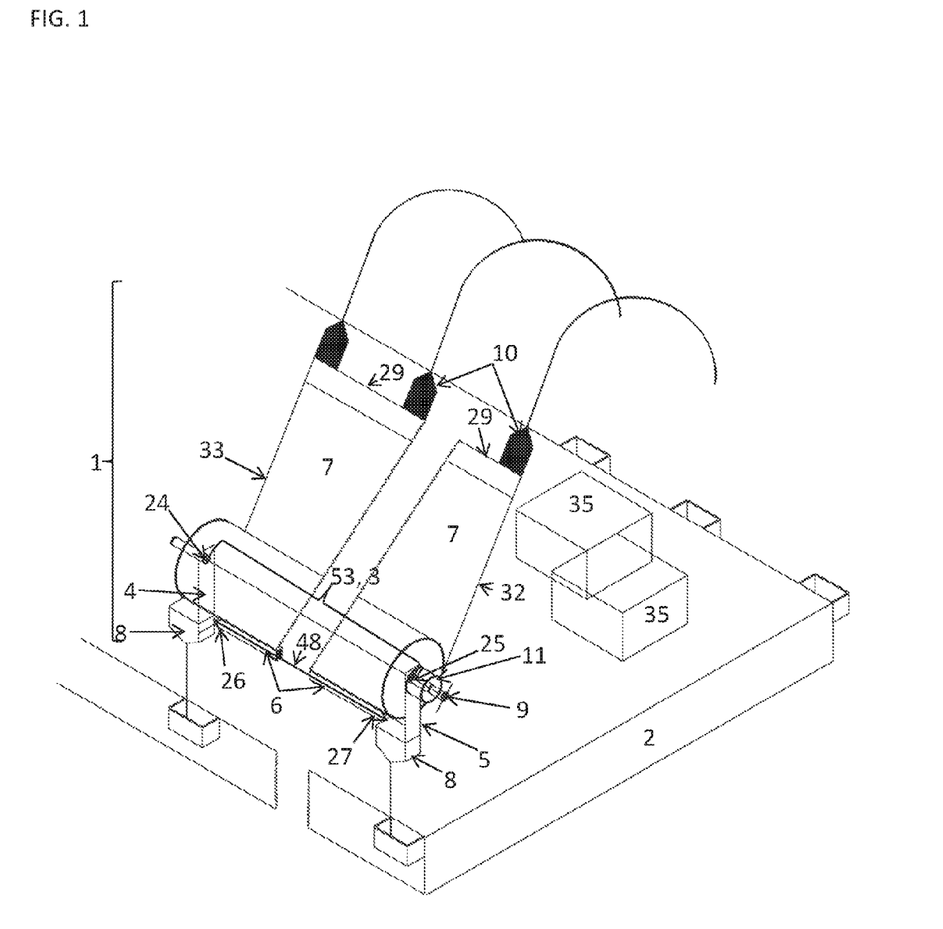
FIG. 1 [Amended] is a view of the portable tarping system and its components.

A portable tarping system 1 for use in covering a load on flatbed trailer 2 comprising a central axis 3, a left end member 4, a right end member 5, a cross member 6, a tarp 7, a plurality of anchor points 8, a retracting means 9, a plurality of attachments 10, and a stop 11.

Figure 2A:
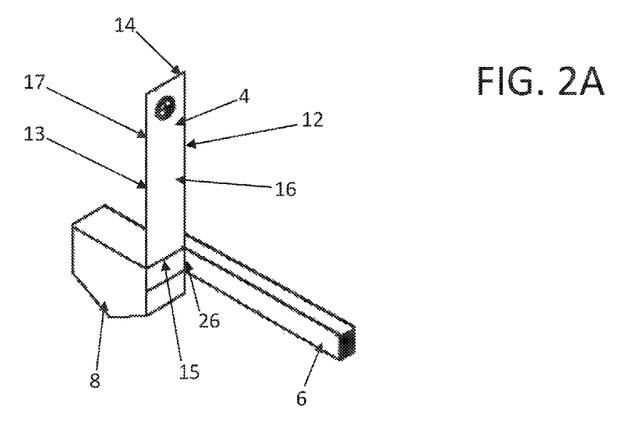
FIG. 2A [Amended] is a view of the left end member and its components.
Figure 2B:
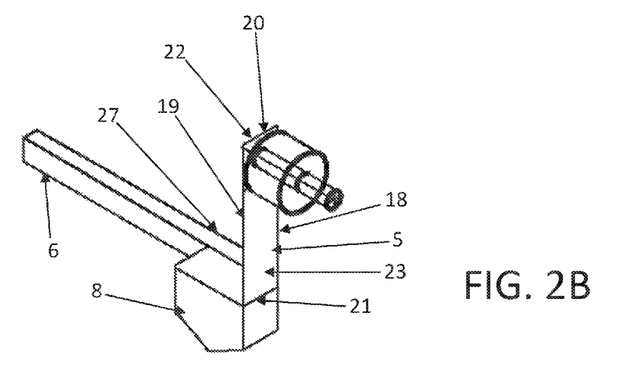
FIG. 2B [Amended] is a view of the right end member and its components.

The left end member 4 has a left back edge 12, a left front edge 13, a left top edge 14, a left bottom edge 15, a left interior face 16 and a left exterior face 17. The right end member 5 as a right back edge 18, a right front edge 19, a right top edge 20, a right bottom edge 21, a right interior face 22 and a right exterior face 23. The central axis 3 is a circular shaft with a left end 24 a right end 25 and a length 53. The left end 24 of the central axis 3 is attached to the left interior face 16 of the left end member 4 in such a fashion to allow the central axis 3 to wind and unwind. The right end 25 of the central axis 3 is attached to the right interior face 22 of the right end member 5 in such a fashion to allow the central axis 3 to wind and unwind. The cross member 6 has a left end 26 of the cross member 6, a right end 27 of the cross member 6 and a length 48. The left end 26 of the cross member 6 is attached to the left back edge 12 of the left end member 4. The right end 27 of the cross member 6 is attached to the right back edge 18 of the right end member 5. Along the length 48 of the cross member 6 are attached a plurality of anchor points 8. The plurality of anchor points 8 are used to attach the portable tarping system to the flatbed trailer 2.

The retracting means 9 is attached to central axis 3 and facilitates the winding of the tarp 7 around the central axis 3. The stop 11 is attached to either the left exterior face 17 of the left end member 4 or the right exterior face 23 of the right end member 5 and once engaged prevents the central axis 3 from further rotating. The retracting means 9 can be but is not limited to a manual crank, a motorized system, a redundant system including a manual crank and a motorized system, or a spring and ratchet system.

Figure 13:
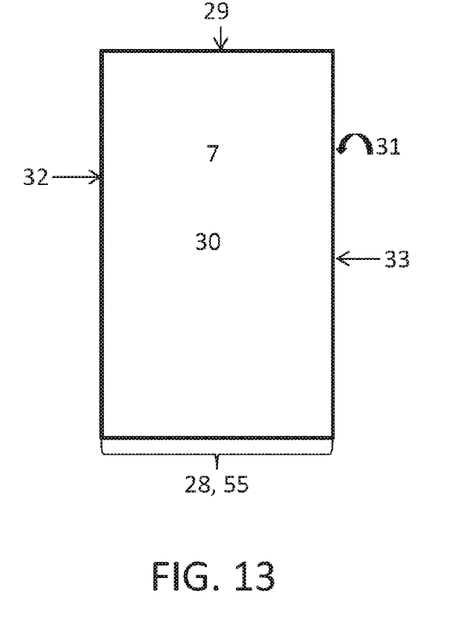

The tarp 7 of the portable tarping system 1 has an attached edge 28 with a length 55, which is attached along the length 53 of the central axis 3, a leading edge 29, which is the edge opposite the attached edge 28, a top 30, a bottom 31, a left length 32 located along the left edge of the tarp 7 if viewed from the attached edge 28 facing the leading edge 29 with the top 30 of the tarp 7 facing up, and a right length 33 located along the right edge of the tarp 7 if viewed from the attached edge 28 facing the leading edge 29 with the top 30 of the tarp 7 facing up. Along the leading edge 29 are a plurality of attachments 10 to attach the tarp 7 to the flatbed trailer 2. The tarp 7 may also have a plurality of fasteners 34 so that one tarp 7 may be attached to an adjacent tarp 7. The tarp 7 has multiple embodiments, wherein each embodiment can be used with any of the four embodiments of the portable tarping system.

Figure 7:
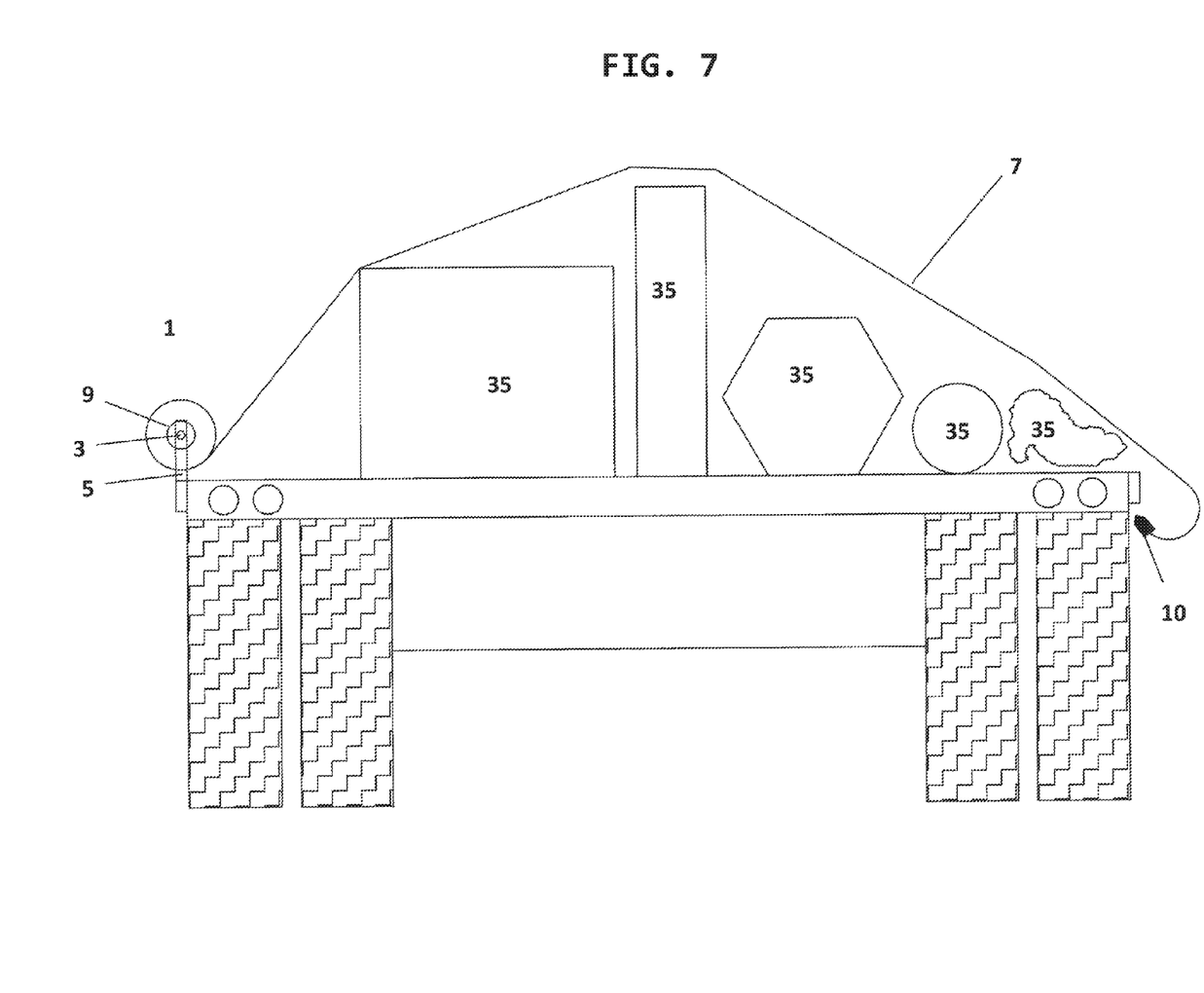
FIG. 7 is a view of the portable tarping system attached to a flatbed trailer while looking at the back end of a flatbed trailer.
Figure 8:
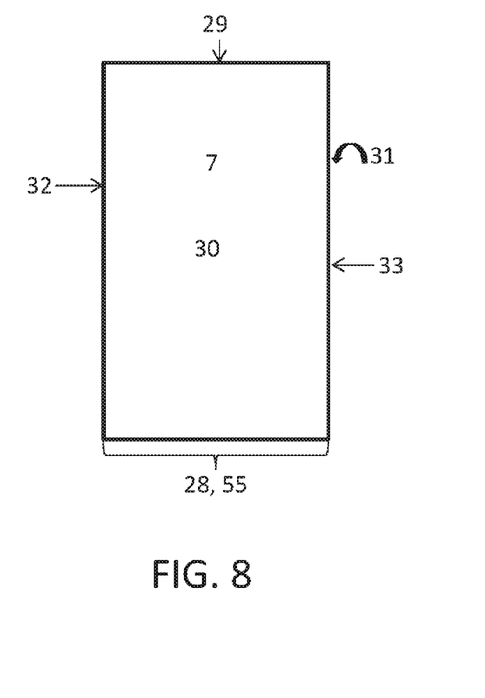
Figure 9:
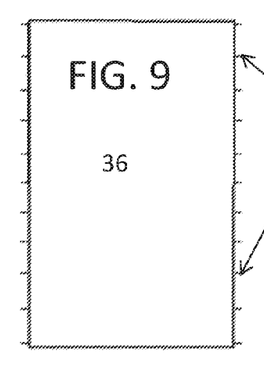
Figure 10:
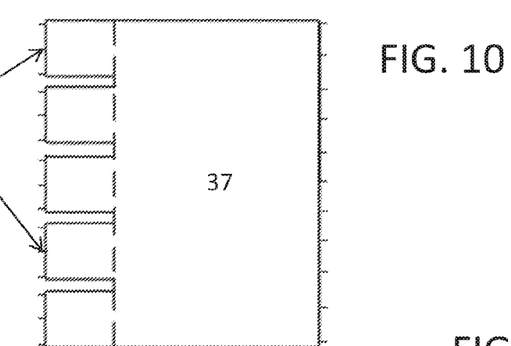
Figure 11:
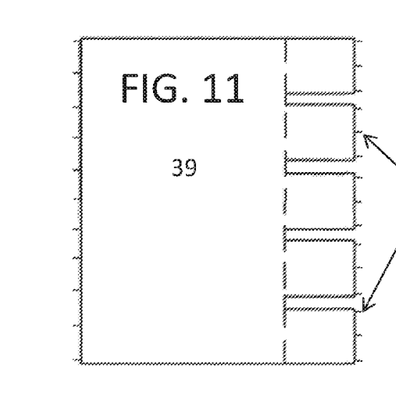
Figure 12:
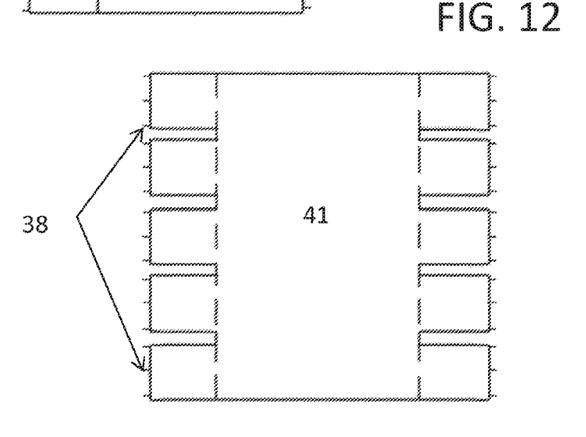

When the portable tarping system 1 is attached to the flatbed trailer 2, the leading edge 29 of the tarp 7 can be unrolled from the portable tarping system 1, pulled over all or a portion of the load 35 on the flatbed trailer 2 and then the leading edge 29 of the tarp 7 can be attached to the flatbed trailer 2 so that the load 35 is covered. Before removing the load 35, the tarp 7 can be removed by detaching the leading edge 29 of the tarp 7 from the trailer 2 and activating the retracting means 9. The retracting means 9 then rolls the tarp 7 around the central axis 3. The portable tarping system 1 can then be removed from the flatbed trailer 2.

Figures 3, 4, 5, 6:
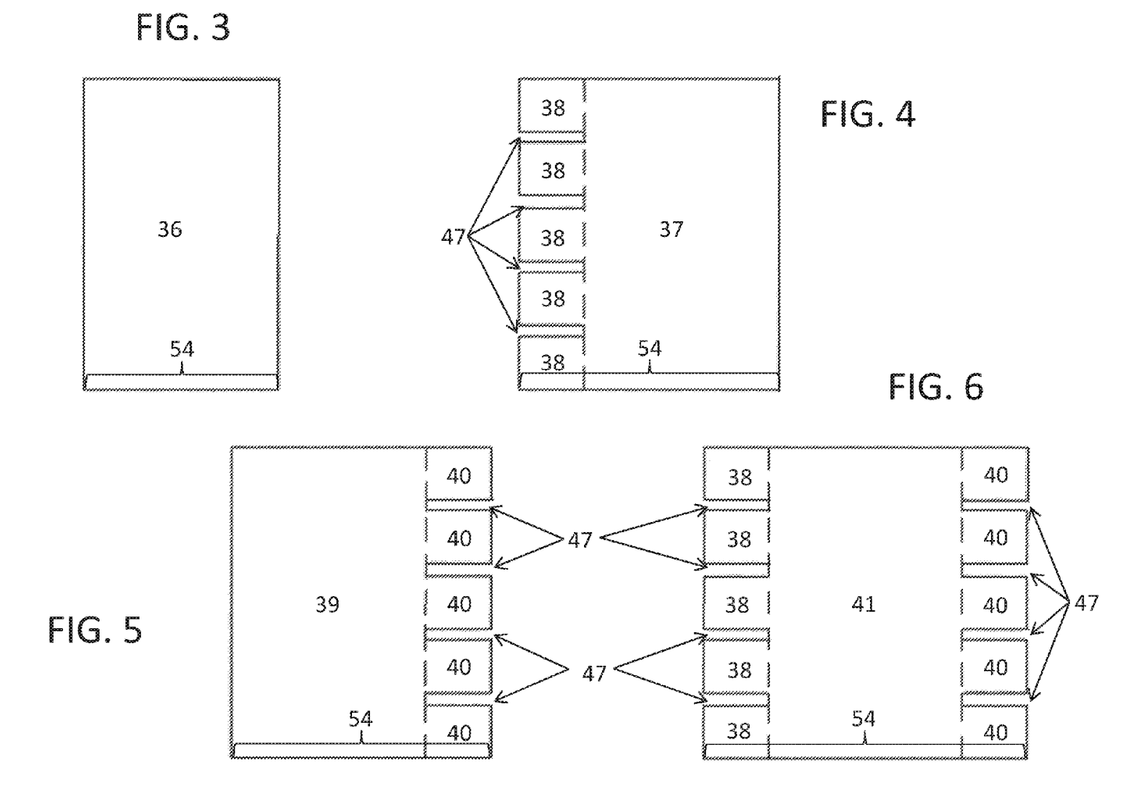
FIG. 3 [Amended] is a view of the portable tarping system and includes a perspective where the tarp is approximately the length of the central axis, the normal tarp.
FIG. 4 [Amended] is a view of a tarp relative to the central axis, which shows a tarp that is wider than the length of the central axis, where the overlap extends beyond the left end of the central axis and displays a plurality of cuts into the left overlap, a left extended tarp.
FIG. 5 [Amended] is a view of a tarp relative to the central axis, which shows a tarp that is wider than the length of the central axis, where the overlap extends beyond the right end of the central axis and displays a plurality of cuts into the right overlap, a right extended tarp.
FIG. 6 [Amended] is a view of a tarp relative to the central axis, which shows a tarp that is wider than the length of the central axis, where the overlap extends beyond the left and right ends of the central axis and displays a plurality of cuts into the right overlap, a dual extended tarp.
Figure 14:
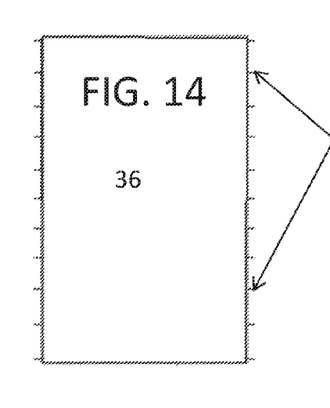
FIG. 14 [New] is a view of the portable tarping system and includes a perspective where the tarp is approximately the length of the central axis, the normal tarp and where there are a plurality of fasteners to attach one tarp to an adjacent tarp.

In the first embodiment of the tarp 7, known as the normal tarp 36, the width 54 of the normal tarp 36, as defined by the length 55 of the attached edge 28 is approximately the same as the length 53 of the central axis 3.

Figure 15:
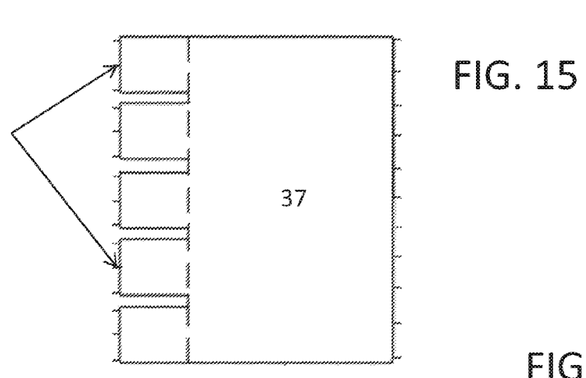
FIG. 15 [New] is a view of a tarp relative to the central axis, which shows a tarp that is wider than the length of the central axis, where the overlap extends beyond the left end of the central axis and displays a plurality of cuts into the left overlap, a left extended tarp and where there are a plurality of fasteners to attach one tarp to an adjacent tarp.

In the second embodiment of the tarp 7, known as the left extended tarp 37, the width 54, as defined by the length 55 of the attached edge 28, is greater than the length 53 of the central axis 3. The left extended tarp 37 is wider than the central axis 3 is long so that in attaching the tarp 7 to the central axis 3, the attaching would start a ways in from the left length 32 along the attached edge 28, creating a left overlap 38, which extends beyond the left end 24 of the central axis 3. In this instance, there are a plurality of cuts 47 into the left overlap 38 to facilitate the left overlap 38 being folded over the main body of the left extended tarp 37 so that the left extended tarp 37 can be rolled up onto the central axis 3.

Figure 16:
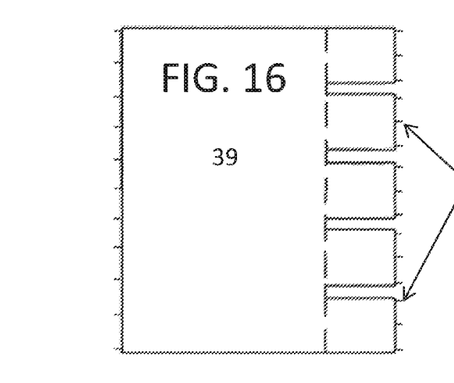
FIG. 16 [New] is a view of a tarp relative to the central axis, which shows a tarp that is wider than the length of the central axis, where the overlap extends beyond the right end of the central axis and displays a plurality of cuts into the right overlap, a right extended tarp and where there are a plurality of fasteners to attach one tarp to an adjacent tarp.

The third embodiment of the tarp 7, known as the right extended tarp 39, the width 54, as defined by the length 55 of the attached edge 28, is greater than the length 53 of the central axis 3. The right extended tarp 39 is wider than the central axis 3 is long so that in attaching the tarp 7 to the central axis 3, the attaching would start a ways in from the right length 33 along the attached edge 28, creating a right overlap 40, which extends beyond the right end 25 of the central axis 3. In this instance, there are a plurality of cuts 47 into the right overlap 40 to facilitate the right overlap 40 being folded over the main body of the right extended tarp 39 so that the right extended tarp 39 can be rolled up onto the central axis 3.

Figure 17:
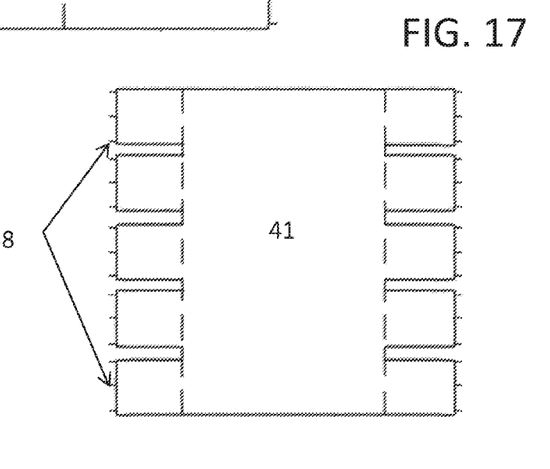
FIG. 17 [New] is a view of a tarp relative to the central axis, which shows a tarp that is wider than the length of the central axis, where the overlap extends beyond the left and right ends of the central axis and displays a plurality of cuts into the right overlap, a dual extended tarp, and where there are a plurality of fasteners to attach one tarp to an adjacent tarp.

The fourth embodiment of the tarp 7, known as the dual extended tarp 41, the width 54, as defined by the length 55 of the attached edge 28, is greater than the length 53 of the central axis 3. The dual extended tarp 41 is wider than the central axis 3 is long so that in attaching the tarp 7 to the central axis 3, the attaching would start a ways in from the right length 33 along the attached edge 28, creating a left overlap 38 and a right overlap 40. In this instance, there are a plurality of cuts 47 into left overlap 38 and the right overlap 40 to facilitate the left overlap 38 and the right overlap 40 being folded over the main body of the dual extended tarp 41 so that and the dual extended tarp 41 can be rolled up onto the central axis 3.

What is claimed:

1. A portable tarping system 1 for covering a load 35 on a flatbed trailer 2 wherein the portable tarping system 1 comprises a central axis 3, a left end member 4, a right end member 5, a cross member 6 that extends from left end member 4 to the right end member 5, a plurality of anchor points 8 affixed to the cross member 6, a retracting means 9, tarp 7, a stop 11, and a plurality of attachments 10;

said left end member 4 comprising a left back edge 12, a left front edge 13, a left top edge 14, a left bottom edge 15, a left interior face 16, and a left exterior face 17;

said right end member 5 comprising a right back edge 18, a right front edge 19, a right top edge 20, a right bottom edge 21, a right interior face 22 and a right exterior face 23;

said central axis 3 comprising a left end 24, a right end 25 and a length 53, with the left end 24 of the central axis 3 being affixed to the left interior face 16 of the left end 24 member 4 and the right end 25 of the central axis 3 being affixed to the right interior face 22 of the right end member 5 in such a manner as to allow said central axis to rotate in a direction perpendicular to the length of the central axis 3;

said cross member 6 comprising a left end 26 of the cross member 6, a right end 27 of the cross member 6 and a length 48 such the that left end 26 of the cross member 6 is attached to the left back edge 12 of the left end member 4 and the right end 27 of the cross member 6 is attached to the right back edge 18 of the right end member 5;

said tarp 7 comprising an attached edge 28 with a length 55, a leading edge 29, a top 30, a bottom 31, a left length 32 located along the left edge of the tarp 7 if viewed from the attached edge 28 facing the leading edge 29 with the top 30 of the tarp 7 facing up, a right length 33 located along the right edge of the tarp 7 if viewed from the attached edge 28 facing the leading edge 29 with the top 30 of the tarp 7 facing up;

said attached edge 28 of said tarp 7 being affixed to said central axis 3 such that the length 55 of said attached edge 28 is affixed to the length 53 of said central axis 3;

said plurality of anchor points 8 being affixed to the cross member 6 such that they attach the cross member 6 to the flatbed;

said retracting means 9 being attached to the central axis 3 in order to cause the central axis 3 to rotate and cause the tarp 7 to be rolled or unrolled around the central axis 3;

said stop 11, when engaged, being used to prevent the central axis 3 from rotating; and said plurality of attachments 10 being attached along the leading edge 29 of the tarp 7 to attach the leading edge 29 of the tarp 7 to the flatbed.

2. The portable tarping system 1 of claim 1 wherein the width 54 of said tarp 7, as defined by the length 55 of the attached edge 28, is approximately the length 53 of the central axis 3, the normal tarp 36.

3. The portable tarping system 1 of claim 2 wherein there are a plurality of fasteners 34 along the left length 32 and right length 33 of in order that the normal tarp 36 may be fastened to an adjacent tarp 7.

4. The portable tarping system 1 of claim 1 wherein the width 54 of said tarp 7, as defined by the length 55 of the attached edge 28, is greater than the length 53 of the central axis 3, wherein said tarp 7 attaches to the central axis 3 starting from the far right end of the attached edge 28 and said tarp 7 extends beyond the length 53 of the central axis 3 to create a left overlap 38, said tarp 7 being known as a left extended tarp 37; and wherein the left overlap 38 further comprises a plurality of cuts 47 to aid in the folding of the left overlap 38 over the main body of the left extended tarp 37 to facilitate rolling the left extended tarp 37 around the central axis 3.

5. The portable tarping system 1 of claim 4 wherein there are a plurality of fasteners 34 along the left length 32 and right length 33 of in order that the left extended tarp 37 may be fastened to an adjacent tarp 7.

6. The portable tarping system 1 of claim 1 wherein the width 54 of said tarp 7, as defined by the length 55 of the attached edge 28, is greater than the length 53 of the central axis 3, wherein said tarp 7 attaches to the central axis 3 starting from the far left end of the attached edge 28 and said tarp 7 extends beyond the length 53 of the central axis 3 to create a right overlap 40, said tarp 7 being known as a right extended tarp 39; and wherein the right overlap 40 further comprises a plurality of cuts 47 to aid in the folding of the right overlap 40 over the main body of the right extended tarp 39 to facilitate rolling the right extended tarp 39 around the central axis 3.

7. The portable tarping system 1 of claim 6 wherein there are a plurality of fasteners 34 along the left length 32 and right length 33 of in order that the right extended tarp 38 may be fastened to an adjacent tarp 7.

8. The portable tarping system 1 of claim 1 wherein the width 54 of said tarp 7, as defined by the length 55 of the attached edge 28, is greater than the length 53 of the central axis 3, wherein said tarp 7 attaches to the central axis 3 starting a ways in from the far right end of the attached edge 28 and said tarp 7 extends beyond the length 53 of the central axis 3 to create a left overlap 38 and a right overlap 40, said tarp 7 being known as a dual extended tarp 41; and wherein the left overlap 38 further comprises a plurality of cuts 47 to aid in the folding of the left overlap 38 over the main body of the dual extended tarp 41 to facilitate rolling the dual extended tarp 41 around the central axis 3; and wherein the right overlap 40 further comprises a plurality of cuts 47 to aid in the folding of the right overlap 40 over the main body of the dual extended tarp 41 to facilitate rolling the dual extended tarp 41 around the central axis 3.

9. The portable tarping system 1 of claim 8 wherein there are a plurality of fasteners 34 along the left length 32 and right length 33 of in order that the dual extended tarp 7 may be fastened to an adjacent tarp.

\* \* \* \* \*